(12) United States Patent
Van der Byl

(10) Patent No.: US 8,508,482 B2
(45) Date of Patent: Aug. 13, 2013

(54) PROGRAMMABLE REMOTE CONTROL

(76) Inventor: Neil Van der Byl, San Diego, CA (US)

( * ) Notice: Subject to any disclaimer, the term of this patent is extended or adjusted under 35 U.S.C. 154(b) by 502 days.

(21) Appl. No.: 12/628,013

(22) Filed: Nov. 30, 2009

(65) Prior Publication Data

US 2011/0128228 A1    Jun. 2, 2011

(51) Int. Cl.
*G06F 3/02* (2006.01)
(52) U.S. Cl.
USPC .................. 345/169; 345/168; 348/14.05
(58) Field of Classification Search
USPC .................. 345/169, 168; 348/14.05
See application file for complete search history.

(56) References Cited

U.S. PATENT DOCUMENTS

| | | | |
|---|---|---|---|
| 6,111,569 | A | 8/2000 | Brusky et al. |
| 6,529,556 | B1* | 3/2003 | Perdue et al. .................. 375/260 |
| 6,563,430 | B1* | 5/2003 | Kemink et al. ................. 340/8.1 |
| 6,879,254 | B1 | 4/2005 | Graham |
| 7,117,250 | B1 | 10/2006 | Wu |
| 8,054,211 | B2* | 11/2011 | Vidal ............................. 341/176 |
| 2002/0190956 | A1 | 12/2002 | Klein et al. .................... 345/169 |
| 2003/0095156 | A1 | 5/2003 | Klein et al. |
| 2003/0103088 | A1* | 6/2003 | Dresti et al. ................... 345/835 |
| 2005/0231134 | A1* | 10/2005 | Sid ................................. 315/294 |
| 2007/0279389 | A1* | 12/2007 | Hoch et al. ..................... 345/169 |
| 2008/0291074 | A1 | 11/2008 | Tzeng et al. |
| 2009/0146860 | A1* | 6/2009 | Kwon ............................ 341/176 |
| 2009/0153289 | A1* | 6/2009 | Hope et al. ..................... 340/5.1 |
| 2009/0284472 | A1* | 11/2009 | Mehta et al. ................... 345/169 |
| 2010/0109850 | A1* | 5/2010 | Kovach et al. ............. 340/10.32 |
| 2010/0141587 | A1* | 6/2010 | Takahashi et al. ............ 345/169 |

FOREIGN PATENT DOCUMENTS

| | | |
|---|---|---|
| EP | 2017962 | 1/2009 |
| WO | WO 2009/006224 | 1/2009 |

OTHER PUBLICATIONS

*Control All of You're a/V Equipment and Access Program Information Wirelessly Via Wi-Fi*, http://www.smartphone.com/59100/Programmable-Wi-Fi-Universal-Remote-Control-With-Color-LCD-Screen-ARRU449/0.aspx (website); No year given.
Logitech, *Logitech Harmony 880 Advanced Universal Remote—with Color LCD Screen and Recharging Station*, http://www.tigerdirect.com/applications/SearchTools/item-details.asp?edpno=1347758 &catId=4647 (website); No year given.
Acoustic Research, *Acoustic Research ARRU449 Universal Smart Remote Control*, http://www.pcmag.com/slideshow_viewer/0,1205,1%253D224312%2526a%253D224311%2526po%253D4,00.asp (website); No year given.

(Continued)

*Primary Examiner* — Lixi C Simpson
(74) *Attorney, Agent, or Firm* — Sony Corporation

(57) ABSTRACT

Methods for operation and a remote control are provided. In one embodiment, a method for operation includes detecting an activity mode for the remote control, wherein the activity mode is based on user programming of the remote control to operate one or more devices for at least one type of communication provided by a communication interface of the remote control. The process may further include detecting a user selection of a user interface of the remote control, wherein the user selection is associated with a command for the one or more devices, and determining a communication setting based on the user selection and the activity mode. The command may be transmitted by the communication interface of the remote control to the one or more of the devices based on the communication setting, wherein transmission of the command is based on one or more communication types of the communication interface.

18 Claims, 6 Drawing Sheets

(56) References Cited

OTHER PUBLICATIONS

Universal TV, *Universal TV Remote Controller Keychain with LED Flashlight*, http://www.dealextreme.com/details.dx/sku.10731~r.40952588 (website); No year given.

Universal Remote, *Universal Remote RF-10 Master Control IR/RF*, http://www.shopwiki.com/_Universal+Remote+RF-10+Master+Control+IR%2FRF (website); No year given.

Ezehome, *The Perfect for Your Living Room PC Remote Control*, http://webatlantis.org/2009/08/05/the-perfect-for-vour-living-room-pc-remote-control/ (website); Aug. 5, 2009.

Vizio, *Vizio LCD TV XVT Series with QWERTY keyboard remote, review and price* http://www.pahing.com/2009/06/vizio-lcd-tv-xvt-series-with-qwerty-keyboard-remote-review-and-price/ (website); Jun. 26, 2009.

IBM, *Universal remote control with Bluetooth-based advanced device detection and control*, http://www.priorartdatabase.com/IPCOM/000011380/ (website); Sep. 1, 2009.

* cited by examiner

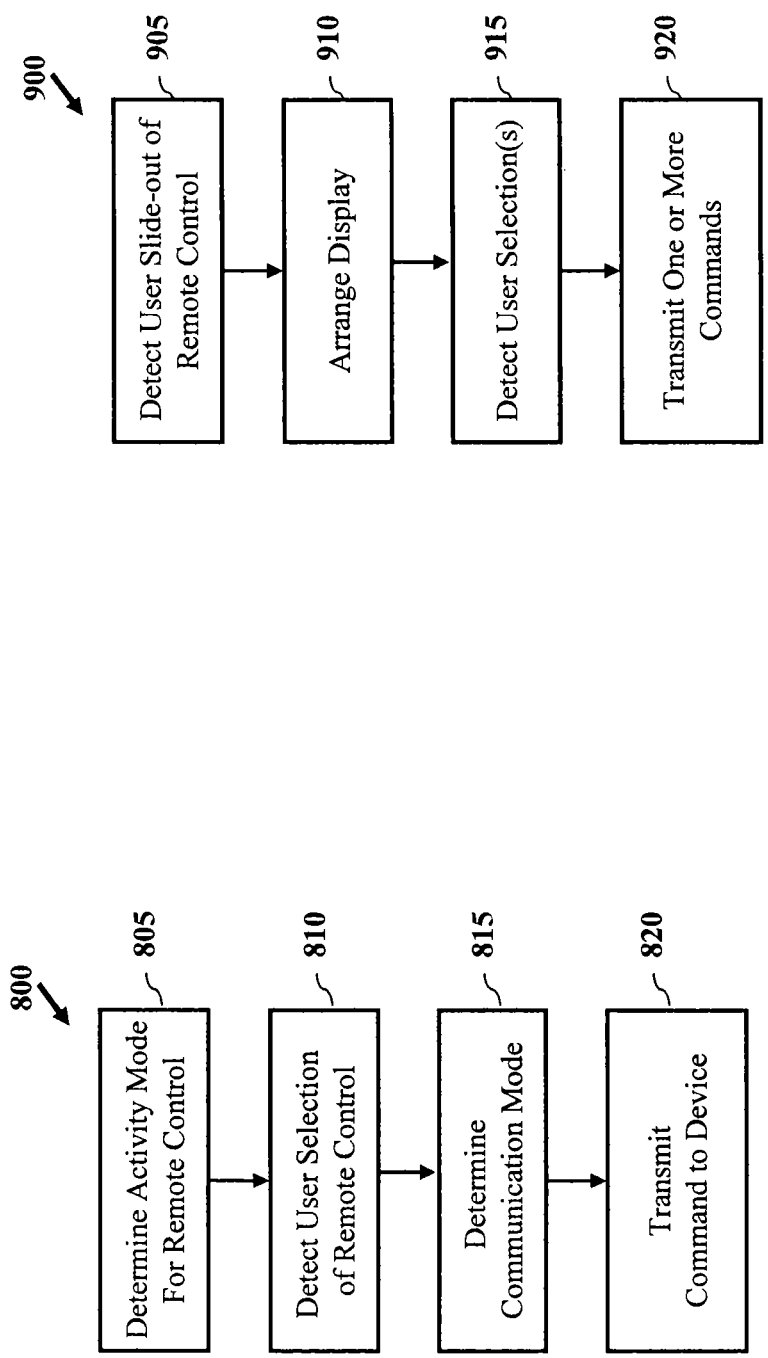

PROGRAMMABLE REMOTE CONTROL

FIELD OF THE INVENTION

The present invention relates generally to a remote control device, and more particularly to programming and operation of a programmable remote control configured for operation with one or more devices.

BACKGROUND OF THE INVENTION

Many consumers own at least one but usually multiple devices with a remote control interface. A great number of these consumers typically use a separate remote control for each device—resulting in remote control clutter. Further, certain devices require transmission of commands based on manufacturer settings. For example, subscribers of satellite programming are typically required to utilize a subscriber provided set-top box, which usually does not operate with the remote control provided by a manufacturer of a display device. One conventional solution is to provide a programmable remote control by a manufacturer, such as satellite provider, which may operate with one or more devices. Although configurable remote controls exist to provide optical control for display devices and other media devices, these remote controls do not provide more than one type of communication and its capability is usually limited to the button layout. Further, many users are deterred from programmable remote controls due to difficulty in programming and/or bulk associated with remote control packaging. Thus, users may still be required to retain one or more manufacturer remote controls for operation of electronic devices.

Conventional remote controls are further limited in their ability to provide user customization and flexibility of controller functions. Many existing "universal" remote controls are limited to operation with one device at a time. For example, these remote controls may be configured to transmit line of sight commands only. In some cases, these devices operate only one device at a time and thus, require a user to provide separate commands to each device—providing they are in using the correct device layout/configuration before sending the command. Further, the conventional devices do not allow for operation of a remote control based on activities of a user, such as viewing broadcast media or viewing recorded media using various combinations of devices. As a result, the conventional methods and devices do not provide users the desired flexibility for intuitively controlling two or more devices in an activity without complex switching procedures.

Thus, there is a desire to provide a programmable remote control, which is easily programmable and allows for flexible configuration and operation with one or more devices.

BRIEF SUMMARY OF THE INVENTION

Disclosed and claimed herein are a system and methods for remote control operation. In one embodiment, a method includes detecting an activity mode for the remote control, wherein the activity mode is based on user programming of the remote control to operate one or more devices for at least one type of communication provided by a communication interface of the remote control. The method further includes detecting a user selection of a user interface of the remote control, wherein the user selection is associated with a command for the one or more devices, determining a communication setting based on the user selection and the activity mode, and transmitting the command, by the communication interface of the remote control, to the one or more of the devices based on the communication setting, wherein transmission of the command is based on one or more communication types of the communication interface.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 8 depicts a process for operation of a remote control according to one or more embodiments; and FIG. 9 depicts a process for transmitting an activation signal according to one or more embodiments.

DETAILED DESCRIPTION OF THE EXEMPLARY EMBODIMENTS

Overview and Terminology

Figure 2:
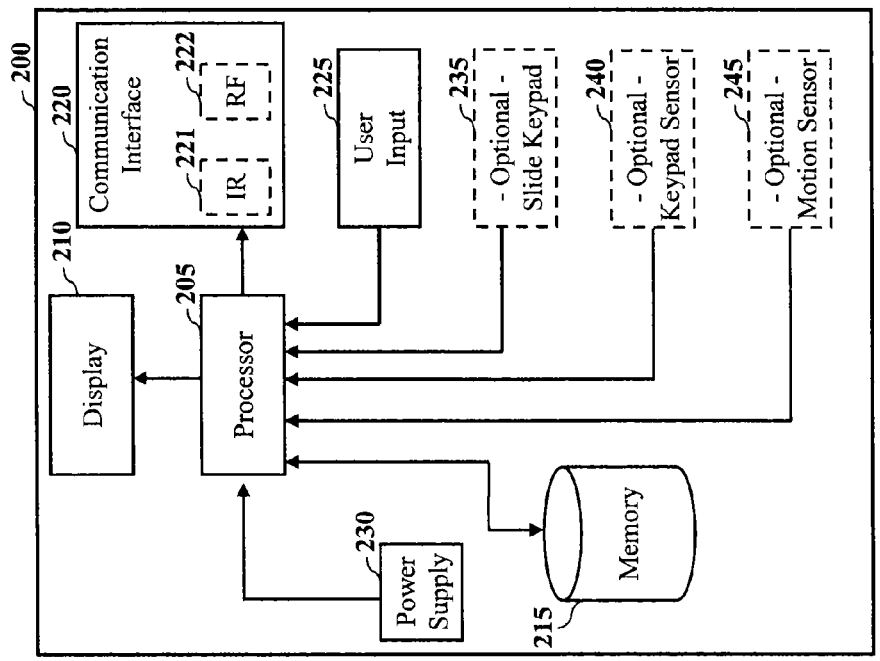
FIG. 2 depicts a simplified block diagram of the remote control of FIG. 1 according to one embodiment.

One aspect of the present invention relates to a remote control which may be configured to operate with one or more devices based on at least one type of communication configuration. In one embodiment, a remote control is provided which may be configured to interoperate with one or more devices based on the communication settings required for the devices to operate. Further, the remote control may be configured to include one or more activity modes, wherein the remote control may be configured for at least one type of wireless transmission based on selection of one or more buttons. In one embodiment, the remote control may be configured for communication base on infrared (IR) and radio frequency (RF) communication. In that fashion, the remote control may be specifically configured to operate a plurality of devices. Additionally, the input interface of the remote control may include one or more buttons and input devices to allow for interoperation with a plurality of devices and allow a user to provide data to one or more applications which are provided by a device. Accordingly, the present invention allows for a single device to control one or more devices while maintaining packaging of the remote control within an acceptable size.

In another embodiment, a process is provided for programming a remote control which may facilitate user programming. The process may be initiated a user providing an identification of the devices to be configured and stored in a database of all user-profiles and may allow for parameters to be wirelessly sent to the remote control to program the controller. The process may further allow for activity based functionality to be determined.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

Figure 1:
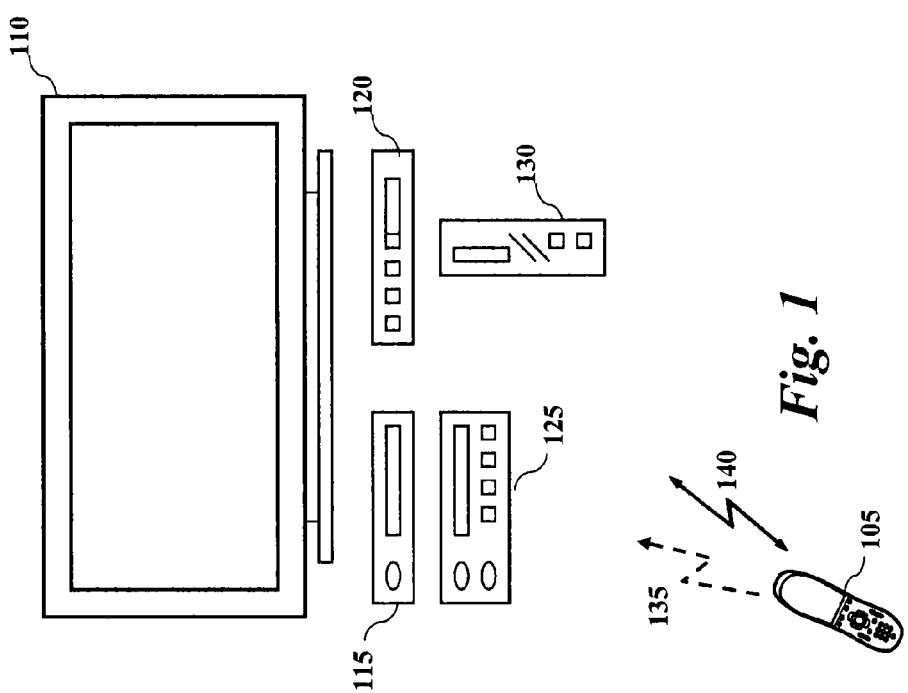
FIG. 1 depicts a graphical representation of a remote control according to one embodiment.

Referring now to the figures, FIG. 1 depicts a graphical representation of a remote control which may be configured for interoperation with one or more devices according to one embodiment of the invention. As shown, remote control 105 may be configured to interoperate with one or more of display device 110, set-top box 115, media player 120 (e.g., DVD™, Blu-ray™, etc.), audio/video receiver 125 and gaming console 130. According to one embodiment, remote control 105 may be programmed to operate with the one or more devices based on an activity mode. In that fashion, buttons of remote control 105 may be employed by a user to operate the one or more devices. As will be discussed in more detail below, one advantage of the invention may relate to programming of remote control as described herein, wherein the programming employed may be simplified for a user in comparison to the conventional methods. Another advantage of remote control 105 may be specific operation of remote control buttons based on one or more of an activity mode and location for operating the remote control.

According to another embodiment, remote control 105 may be configured for wireless communication relative to the one or more devices using one or more communication types. By way of example, remote control 105 may be configured to transmit wireless signals to the one or more devices using optical signals (e.g., IR signals). As shown in FIG. 1, wireless transmission 135 may relate to optical transmission of a control signal, wherein the control signal relates to a line of sight communication with the devices. For example, transmission 135 may relate to IR transmission for operation of display device 110. Remote control 105 may be configured to program the format and type of transmission based on a plurality of display device types and manufactures.

In one embodiment, remote control 105 may be configured for short range communication (e.g., radio frequency (RF), Bluetooth®, Wifi, etc.) with one or more devices. Additionally, short range communication may relate wireless communication with a network device, such as communication based on an 802.11 protocol, for network based applications. As such, remote control 105 may be configured to transmit one or more commands to the one or more devices based on detection of a user selection of a button. Further, short range communication may allow for remote control 105 to receive data for display and/or programming data for the remote control. According to another embodiment, wireless transmission 140 may relate to non-line of sight transmission for operation of devices which may be obstructed. Accordingly, communication 140 may relate to one or more wireless communications of remote control 105 relative to the one or more devices. Parameters and settings for communications with the one or more devices may be stored on remote control 105.

Wireless communication by the remote control may further be associated with one or more activity modes. As will be discussed in more detail below, remote control 105 may include one or more activity modes associated with one or more devices, wherein buttons and/or operation of remote control 105 is based on an activity mode selected by a user. Similarly, operation of remote control 105 may be associated with one or more rooms or locations. In that fashion, remote control 105 may provide a solution to replace existing remote controls and simplify use.

Although not shown in FIG. 1, it may also be appreciated that remote control 105 may be configured to interoperate with additional devices, such as home control devices (e.g., blind operation, HVAC controls, security system, etc).

Referring now to FIG. 2, a simplified block diagram is depicted of the remote control of FIG. 1 according to one or more embodiments of the invention. As shown in FIG. 2, remote control 200 (e.g., remote control 105) includes processor 205, display 210 (e.g., LED, OLED display), memory 215, communication interface 220, user input interface 225 and power supply 230. Processor 205 may be configured to control operation of remote control 200 based on one or more computer executable instructions stored in memory 215. Display 210 may be employed to display menu functions, an activity mode, activity modes available, a location the remote control is currently operating, programming information, data provided by an application of the one or more devices, etc. In certain embodiments, display 210 may be configured to display data associated with an application with one or more devices (e.g., a web application, device setup, remote programming, etc.). Display 210 may relate to a touch screen display in some embodiments. Display 210 may also provide a backlight and messages to the user related to operation of the remote control including, for example, a low power indication of power supply 230.

Communication interface 220 relates to the one or more communications services provided by the remote control. In an exemplary embodiment, communication interface 220 may include one or more elements to allow for transmission of one or more of line of sight commands (e.g., transmissions 135) and non-line of sight communications (e.g., communication 140). Communication interface 220 may be controlled by processor 205 for transmission and communication commands by remote control 200. Although communication interface 220 is shown as a single element, it should be appreciated that remote control 200 may include one or more elements for wireless communication. Further, communication interface 220 may include IR elements 221 and RF components 222 for infrared (IR) communication and radio frequency (RF) communication, respectively. Formatting for the remote control communications may be programmable to allow for interoperation with one or more devices associated with different manufacturers. Settings for communication interface may be stored in memory 215. In one embodiment settings provide one or more IR formats, short range communication profiles (e.g., Bluetooth™ profiles) and network communication protocols. In an exemplary embodiment, remote control may be configured to store up to twenty communication settings.

User input 225 of remote control 200 may relate to one or more buttons (e.g., numerical keypad, volume control, channel control, menu controls), a pointing device (e.g., track ball), mode selection buttons, play back functionality (e.g., play, stop, pause, forward, reverse, slow motion, etc). In that fashion, a user of remote control 200 can command one or more devices. Buttons of user input 225 may include hard and soft buttons, wherein functionality of the soft buttons may be based on an activity mode.

Remote control 200 may be powered by a rechargeable power supply 230 comprised of one or more rechargeable cells. As will be discussed in FIG. 3, remote control 200 may include one or more terminals (not shown) for coupling power supply 230 to a charging port.

According to another embodiment, remote control 200 may include an optional slide-out keypad 235 including one or more buttons (e.g., qwerty keyboard) which will be discussed in more detail below with reference to FIG. 7. The optional keypad may be employed to detect user selections for interoperation with one or more applications (e.g., a social networking application, chat application, messaging, PC on TV, etc.).

Figure 3:
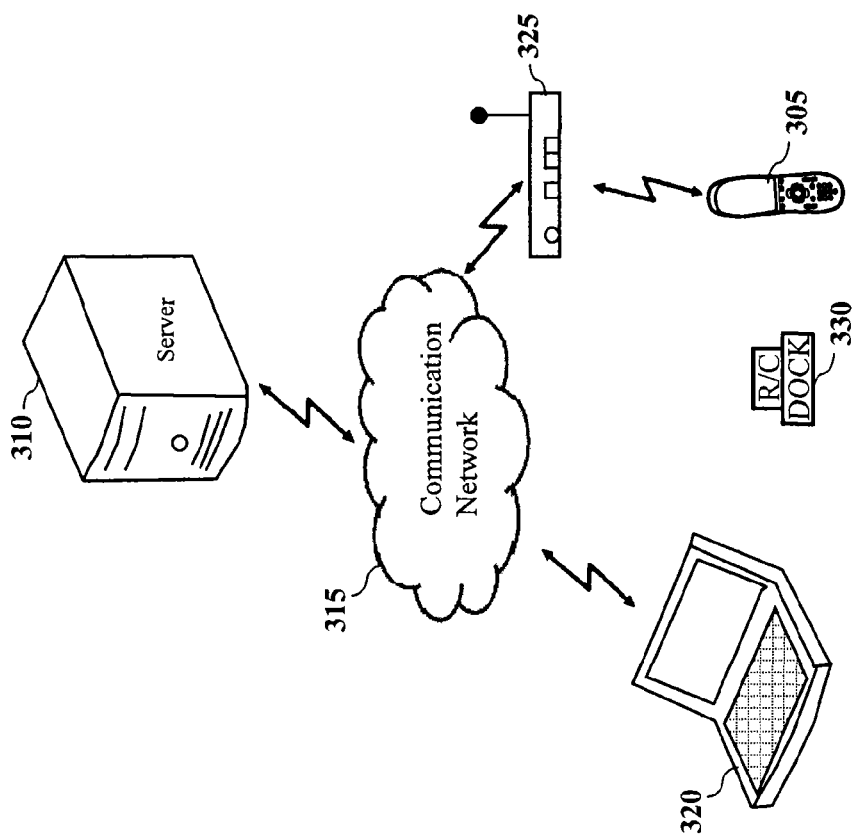
FIG. 3 depicts a simplified system diagram of a system for configuration of a remote control according to one embodiment.

In another embodiment, the remote control may be programmed based on data received from one or more devices in communication with the remote control. Additionally, data provided to the remote control may be based on one or more devices specified by a user. Referring now to FIG. 3, a simplified system diagram is depicted according to one embodiment for providing parameters to configure the remote control of FIG. 1. A user may employ at least one of the remote control 305 (e.g., remote control 105) and personal computing device 320 to identify one or more devices for the remote control to operate. In one embodiment, one of remote control 305 and computer 320 may include an application to access server 310 to retrieve one or more parameters required to program remote 305.

In one exemplary embodiment, the remote control programming application may provide a user interface and set-up process wherein a user can identify one or more devices for the remote control to interface with. As will be discussed in FIG. 4, the setup program can access server 310 to obtain data for programming remote control 305. As shown in FIG. 3, one of remote control 305 and computer 320 may be employed by user to provide to server 310 via communication network 315. Communication network 315 may relate to one or more of a telephone network, packet switched transmission network (PSTN), interne protocol (IP) network, etc. Server 310 may then provide one or more device codes, parameters and/or transmission formats which remote control 305 may employ to configure communication options. In one embodiment, remote control 305 may be configured for communication with server 310 by way of a network device 325 (e.g., router). Alternatively, or in combination, remote control 305 may interoperate with computer 320 to receive programming data. In certain embodiments, remote control 305 may be coupled to a docking station 330 for charging and/or coupling to computer 320.

The set-up program may further be configured to allow a user to indicate devices associated with an activity mode and/or location, such as a room. Server 310 may relate to a server provided by the manufacturer of the remote control and may include one or more databases for storage of devices codes and parameters. In that fashion, memory required for storage of devices codes by remote control 305 may be minimized. The set-up program may further be configured to provide sample activity modes as will be discussed in more detail with reference to FIG. 5 below.

Figure 4:
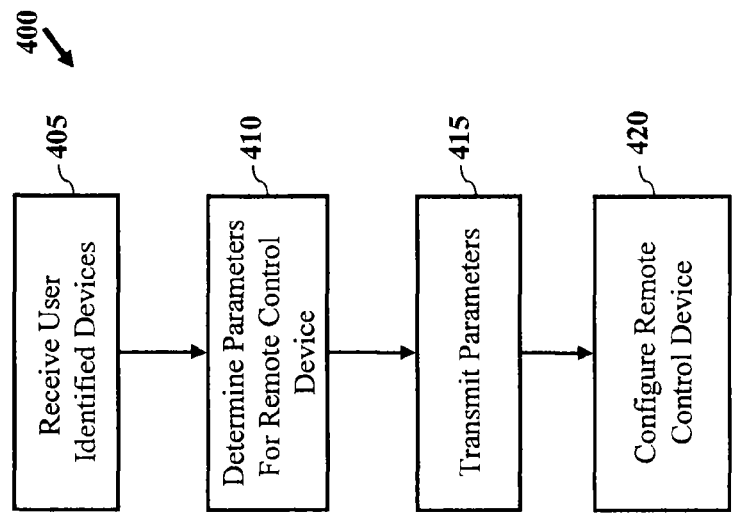
FIG. 4 depicts a process for configuring a remote control according to one or more embodiments.

Referring now to FIG. 4, a process is depicted for programming a remote control by a set-up program according to one or more embodiments. Process 400 may be initiated by a server receiving user identified devices at block 405. For example, a remote control set-up program may include one or more drop down menus to aid in selection of a device. According to another embodiment, when a user is only aware of a manufacturer and type of device but not the particular model, the set-up program may allow for a plurality of parameters to be sent to the remote control. Based on the devices identified, the server (e.g., server 310) may be configured to determine one or more parameters required by the remote control at block 410. The server may transmit the parameters to the remote control via a network device (e.g., router 325) at block 415. Alternatively, the parameters may be transmitting to a computer executing the set-up application (e.g., computer 320). Parameters transmitted by the server may further include one or more preferences supplied by the user for programming the remote control. For example, the parameters may associate one or more activity mode indicators with one or more devices. In that fashion, the remote control may be configured to program operation based on the received parameters at block 420. In contrast to conventional methods, programming of the remote control by the user may be facilitated.

Figure 5:
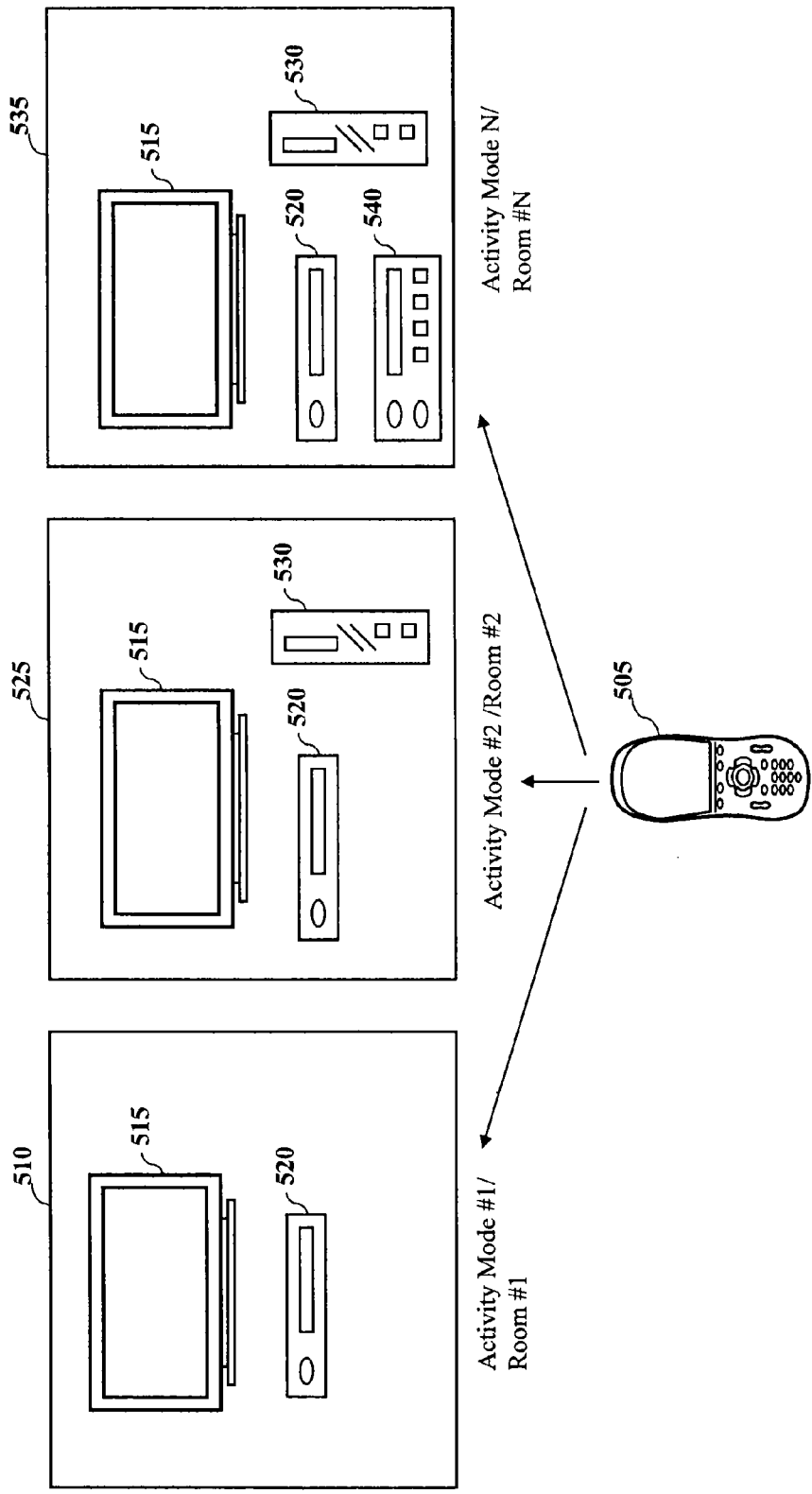
FIG. 5 depicts a graphical representation of one or more activity modes for a remote control according to one or more embodiments.

Referring now to FIG. 5, a graphical representation is depicted of one or more remote control activity modes. According to one embodiment, a remote control (e.g., remote control 105) may be configured for one or more activity modes. For example, an activity mode may relate to control of one or more devices and configuration of remote control operation based on the configurations. Activity mode 510 includes operation for display device 515 (e.g., display device 110) and set-top box 520 (e.g., set-top box 115). For example, a user may select activity mode 510 via selection of a button on the remote control interface and/or display. The remote control may then configure the remote control for operation with display device 515 and set-top box 520 for viewing television. As such, one or more buttons of remote control 505 may operate display device 515 (e.g., volume, power, menu, etc.) and one or more buttons of remote control 505 may operate set-top box 520 (e.g., channel, power, guide, digital video recording commands).

Referring now to activity mode 525, remote control 505 may be configured to operate display device 515, set-top box 520 and gaming console 530. In comparison to conventional remote controls which may not operate with gaming consoles and/or operate with a single transmission type, remote control 505 may be configured to transmit one or more commands to devices 515, 520 and 530 based on one or more transmission formats. User selection of activity mode 525 may additional configure remote control 505 for operation including line of sight transmissions (e.g., IR transmission) to display device 515 in a first format, line of sight transmissions to set-top box 520 in a second format and short range communications to gaming console 530. Similarly, as shown in activity mode 535, remote control 505 may be configured to operate an audio receiver 540 using a transmission format based on parameters received during programming. According to another embodiment, activity modes 510, 525 and 535 may be associated with a location. Thus, each location may include one or more activity modes based on devices located in the location.

According to another embodiment, activity modes 510, 525 and 535 shown in FIG. 5 may each relate to a different location, such as a living room, media room, rec. room, etc. In that fashion, remote control device 505 may be configured to detect user input of a location, such as previously stored location. As such, operation of remote control 505 will be based on the location selected and/or activity mode.

In one embodiment, an activity mode may relate to an application provided by one or more of the devices. For example, game console 530 may be configured to allow for network access and further provide access to one or more network applications (e.g., social networking, chat, etc.) where functions of the remote control may interoperate with the application. As will be discussed in more detail below with respect to FIG. 7, detection of user activation of buttons, such as a slide-out key board, or trackball may be transmitted to the game console, or device running the application. In certain embodiments, user activation of remote control may override an activity mode.

Figure 6:
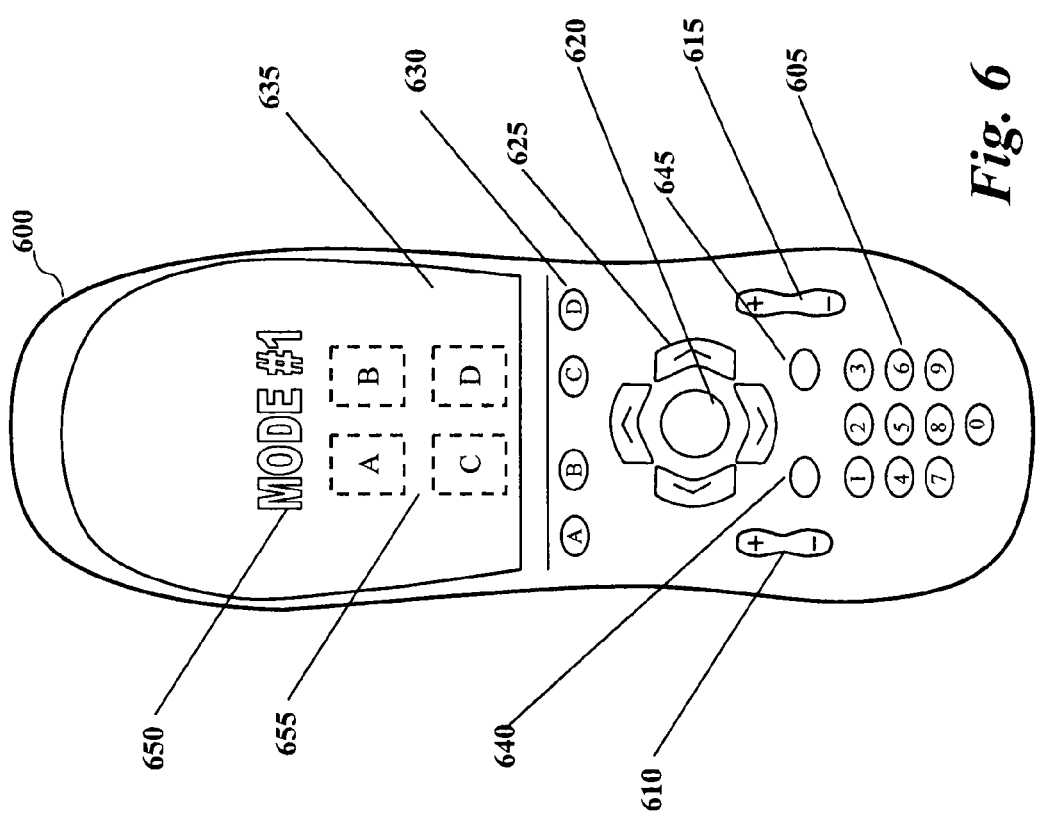
FIG. 6 depicts a graphical representation of a remote control according to one or more embodiments.

Referring now to FIG. 6, a graphical representation is depicted of a remote control according to one embodiment. As shown in FIG. 6, remote control 600 (e.g., remote control 105) may include a numerical keypad shown as 605 which may be used for operation of one or more devices, such as a display device (e.g., display device 110) and/or set-top box (e.g., set-top box 115) to identify a channel for tuning. Remote control 600 may further include volume adjuster 610 and channel adjuster 615 which may be employed to operate one or more devices. As further shown, remote control 600 includes trackball 620 and directional buttons 625 which may be employed for pointing and/or navigation of web-based applications. In certain embodiments, trackball 620 may be operated for pointing and may further be depressed to indicate a user selection. For transmitting commands for a web-based application, these buttons may be configured for control of the web application, viewing of image and video data and web-based services in general.

In one embodiment, remote control 600 includes activity mode buttons A-D, shown as 630 in FIG. 6. As discussed above, activity mode buttons 630 may be used to select an operational mode of remote control 600. In another embodiment, based on selection of an activity mode button, display 635 may display the current activity mode. Remote control 600 may further include soft buttons shown as 640 and 645 associated with an activity mode for operation of one or more devices, such as activation of features of a set-top box. Soft buttons 640 and 645 may be selected and/or identified by the display of remote control 600. Display 635 may further be configured to display activity mode and indicate provide instructions on device programming and/or operation. As shown in FIG. 6, exemplary display message 650 is shown. Target areas or selectable buttons of the display, shown as 655, may be selected using trackball 620 and/or one or more buttons of the remote control. Target buttons 655 may be associated with one or more features of the remote control and/or of a web application. Using trackball 620, a user may highlight and then press the trackball to select a particular target area.

Figure 7:
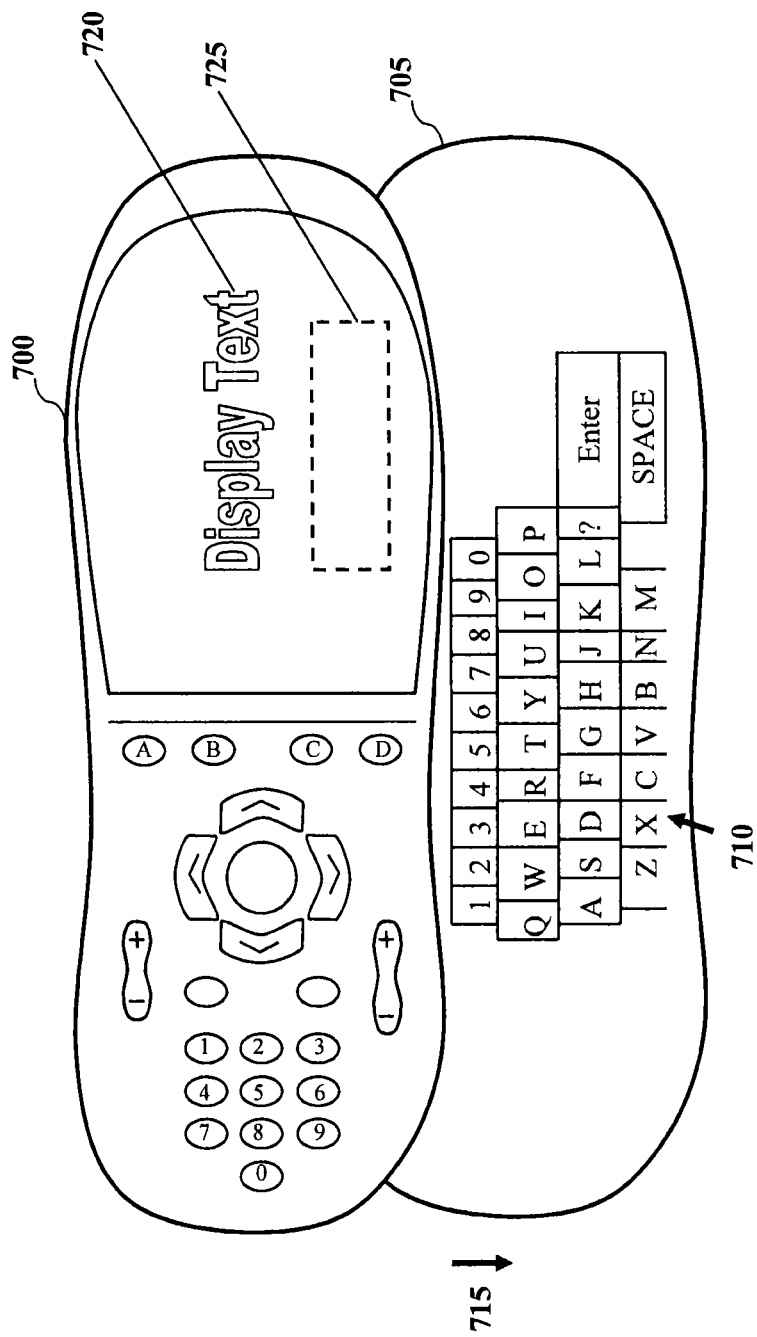
FIG. 7 depicts a graphical representation of a remote control according to one or more embodiments.

Referring now to FIG. 7, a graphical representation is shown of a slide-out keypad according to one embodiment. Remote control 700 (e.g., remote control 105) includes an optional slide-out portion 705 which may include one or more buttons shown as 710. Buttons 710 may relate to a "QWERTY" keypad and include one or more command buttons and/or alphabet buttons. According to one embodiment, when the slide portion is fully extended, as shown in direction 715, remote control 700 may be configured to enter a particular activity mode. Further, the remote control may be configured to orient the display based on detection of the slide-out portion. Exemplary display text 720 is shown according to one embodiment. In comparison to the orientation of display message 650, display text 720 is oriented to better suit a user. Keypad 710 may be used for social networking and/or messaging features provided by one or more of the devices with network capabilities. In one embodiment, remote control 700 may display characters in a text box 725 for transmission of a string of one or more characters. In certain embodiments, keypad 710 may further be employed to input one or more user settings to remote control 700, such as for commands for programming the device.

Referring now to FIG. 8, a process is depicted for operation of the remote control (e.g., remote control 105) according to one or more embodiments. Process 800 may be initiated by the remote control determining an activity mode at block 805. In one embodiment, the activity mode can be based on user programming of the remote control to operate one or more devices for at least one type of communication provided by a communication interface of the remote control. At block 810, the remote control may detect a user selection of a remote control. The user selection is associated with a command for the one or more devices. For example, the remote control may detect selection of a channel selection button (e.g., channel selector 615). The user selection may also relate to manipulation of a pointing device, such as track ball 620 and/or one or more selections of slide-out keypad 710 for operation with a network based application and/or devices programmed for use with the remote control.

Process 800 may continue by the remote control determining the communication setting of the device at block 815. The communication setting may be determined based on the user selection and the activity mode. Based on the determined activity mode and communication mode, the remote control can transmit a command at block 820. Transmission of the command may be based on one or more communication types of the communication interface. For example, the user selection of channel up may prompt a line of sight transmission formatted for a set-top box (e.g., set-top box 115). In certain embodiments, user selection of a power button may result in transmission of a line of sight communication (e.g., IR) and a short range wireless communication (e.g., Bluetooth™).

In an alternative embodiment, transmission of a command by the remote control may be based on one or more macro settings. For example, upon detection of a user selection, the processor of the remote control may access remote control memory for one or more predetermined communication settings. Communication settings stored by the remote control memory may indicate one or more communication types for transmission of a command based on a particular activity mode.

Referring now to FIG. 9, a process is depicted for operation of the remote control of FIG. 1 according to one or more embodiments. Process 900 may be initiated by detection of a slide-out portion of the remote control (e.g., slide-out portion 705) at block 905. At block 910, the remote control may arrange the display based on detection of slide-out portion. For example, the display may arrange test and/or display elements for orientation associated with the slide-out portion. Exemplary text 720 is shown to illustrate modification of a display element. The remote control may then detect one or more user selections at block 915. User selections may be displayed by the remote control prior to transmission. For example, selection of characters for messaging features may be displayed. The one or more commands may be transmitted based on the user selections at block 920. When user selection of the buttons relates to a series of keypad entries, the remote control may be configured to transmit a plurality of commands based on the user selection. For example, user selection of a series of buttons associated with a string of characters (e.g., LOL) may be transmitted in a single communication. Alternatively, user selection of a button enter may be transmitted once selection of the button is detected.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A method for remote control operation comprising:
    detecting an activity mode of a plurality of activity modes for the remote control, wherein the activity mode is based on user programming of the remote control to operate at least two devices associated with different communication protocols provided by a communication interface of the remote control, wherein individual inputs of a user interface of the remote control are associated with control of the at least two devices, wherein the user interface comprises a slide-out keypad of the remote control and wherein the detection of the activity mode of the plurality of activity modes is based on a slide position of the slide-out keypad;
    detecting a user selection of at least one input of the user interface of the remote control, wherein the user selection is associated with a command for the at least two devices;
    determining a communication setting based on the user selection and the activity mode; and
    transmitting the command, by the communication interface of the remote control, to each of the at least two devices based on the communication setting, wherein transmission of the command to each of the at least two devices is based on the different communication protocols of the communication interface.

2. The method of claim 1, wherein the one or more communication protocols relate to one or more of: infrared (IR) transmission, radio frequency (RF) communication, short range wireless communication and wireless network communication, and wherein the communication setting indicates communication protocols for each command.

3. The method of claim 1, wherein the user selection of the at least one input of the user interface relates to one or both of: activation of a button and manipulation of a trackball of the user interface.

4. The method of claim 1, further comprising detecting user positioning of the slide-out keypad, wherein the user selection relates to a selection of the slide-out keypad for operation with a network based application.

5. The method of claim 1, wherein the slide-out keypad relates to a QWERTY keypad.

6. The method of claim 1, further comprising displaying the user selection of the slide-out keypad associated with the network based application on the remote control.

7. The method of claim 1, wherein the user programming of the remote control comprises programming for operation in one or more locations, wherein the detection of the activity mode of the plurality of activity modes of the remote control is based on the remote control being in proximity to the one or more locations.

8. The method of claim 1, wherein the user programming of the remote control is further based on one or more parameters received from a network connection provided by the communication interface.

9. The method of claim 1, further comprising detecting the user selection of at least one other input of the user interface for detection of the activity mode and adjusting the communication setting for the remote control.

10. A remote control comprising:
    a display;
    an input interface including a plurality of user inputs;
    a communication interface configured for a plurality of communication protocols; and
    a controller coupled to the display, input interface, and communication interface, the controller operable to:
        detect an activity mode of a plurality of activity modes for the remote control, wherein the activity mode is based on user programming of the remote control to operate at least two devices associated with different communication protocols provided by a communication interface of the remote control, wherein individual inputs of a user interface of the remote control are associated with control of the at least two devices, wherein the user interface comprises a slide-out keypad of the remote control and wherein the detection of the activity mode of the plurality of activity modes is based on slide position of the slide-out keypad;
        detect a user selection of at least one input of the input interface of the remote control, wherein the user selection is associated with at least one command for the at least two devices;
        determine a communication setting based on the user selection and the activity mode; and
        control the communication interface transmission of the at least one command to each of the at least two devices based on the communication setting, wherein transmission of the command to each of the at least two devices is based on the different communication protocols of the plurality of communication protocols of the communication interface.

11. The remote control of claim 10, wherein the one or more communication protocols relate to one or more of: infrared (IR) transmission, radio frequency (RF) communication, short range wireless communication and wireless network communication, and wherein the communication setting indicates communication protocols for each command.

12. The remote control of claim 10, wherein the user selection relates to one or both of: activation of a button, and manipulation of a trackball of the user interface.

13. The remote control of claim 10, wherein the controller is further operable to detect user positioning of the slide-out keypad, wherein the user selection relates to a selection of the slide-out keypad for operation with a network based application.

14. The remote control of claim 10, wherein the slide-out keypad relates to a QWERTY keypad.

15. The remote control of claim 10, wherein the controller is further operable to control display of the user selection of the slide-out keypad associated with the network based application on the remote control.

16. The remote control of claim 10, wherein the user programming of the remote control comprises programming for operation in one or more locations, wherein the detection of the activity mode of the plurality of activity modes of the remote control is based on the remote control being in proximity to the one or more locations.

17. The remote control of claim 10, wherein the user programming of the remote control is further based on one or more parameters received from a network connection provided by the communication interface.

18. The remote control of claim 10, wherein the controller is further operable to detect another user selection of the user interface for detection of the activity mode and adjust the communication setting for the remote control.

* * * * *